July 28, 1925. 1,548,014
C. F. HETHERINGTON
PAVEMENT PLANT
Filed May 4, 1922 3 Sheets-Sheet 1
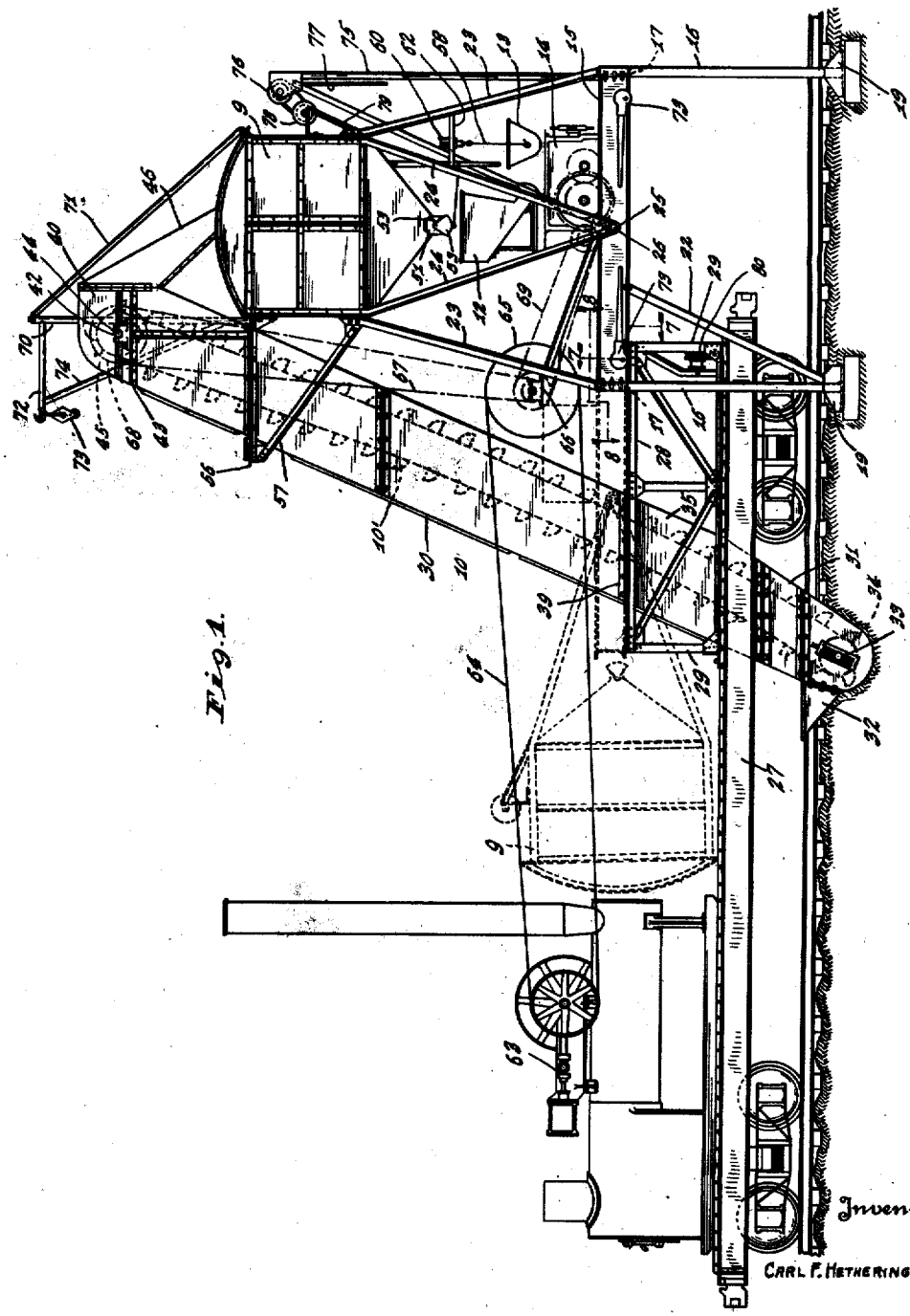
Inventor
CARL F. HETHERINGTON,
By
Arthur M. Hood
Attorney July 28, 1925.

C. F. HETHERINGTON

PAVEMENT PLANT

Filed May 4, 1922

Inventor
CARL F. HETHERINGTON,

By Arthur M. Hood
Attorney

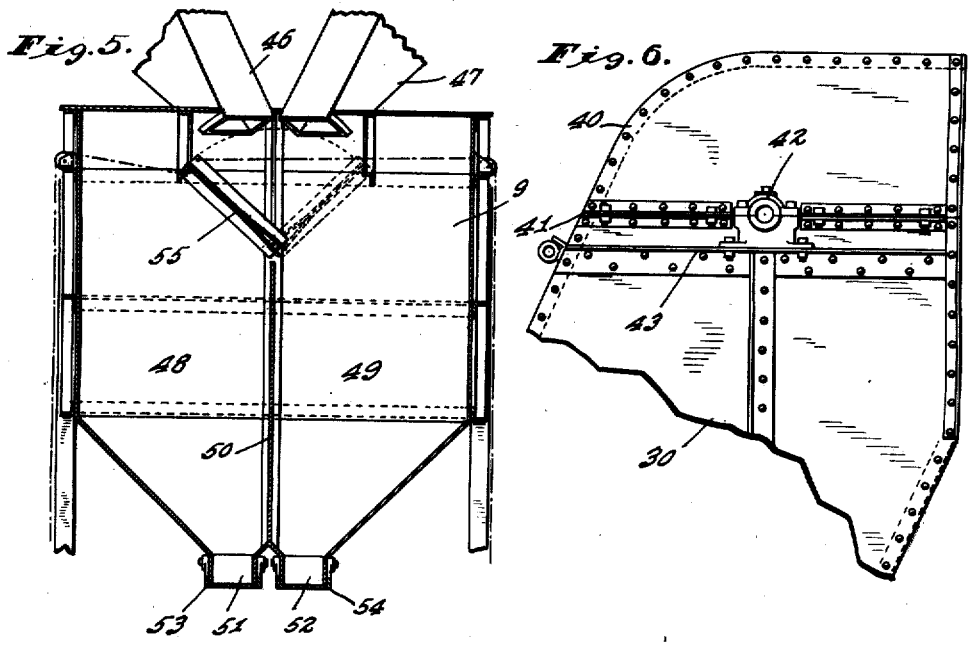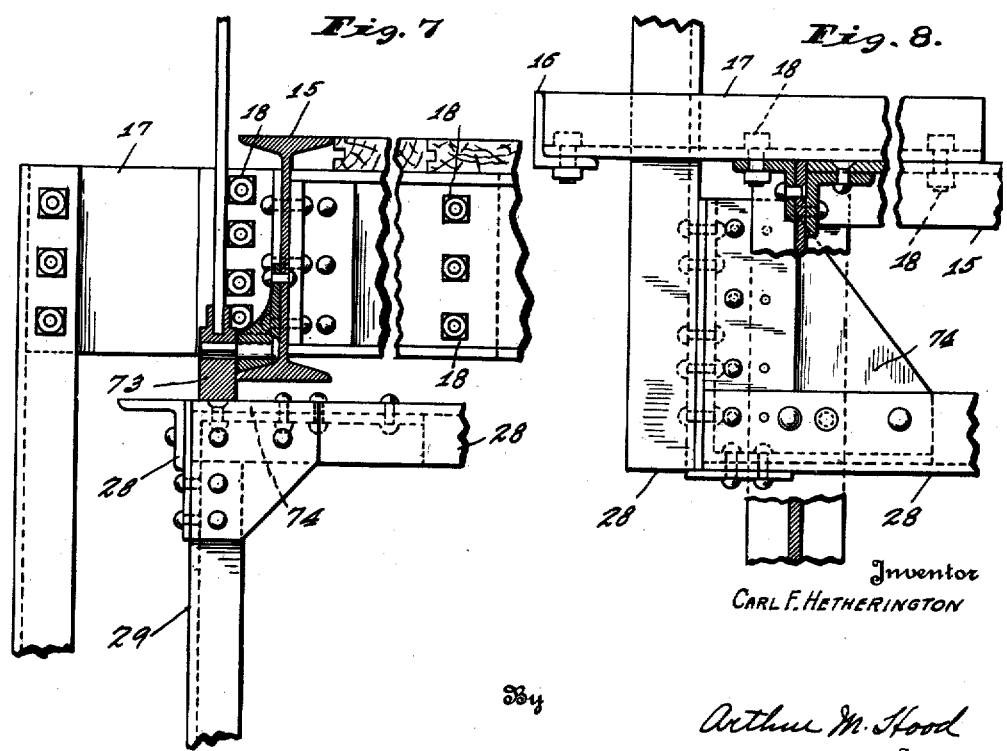

Patented July 28, 1925.

1,548,014

UNITED STATES PATENT OFFICE.

CARL F. HETHERINGTON, OF INDIANAPOLIS, INDIANA, ASSIGNOR TO THE EMULSIFIED ASPHALT COMPANY, OF INDIANAPOLIS, INDIANA, A CORPORATION OF INDIANA.

PAVEMENT PLANT.

Application filed May 4, 1922. Serial No. 558,551.

*To all whom it may concern:*

Be it known that I, CARL F. HETHERINGTON, a citizen of the United States, residing at Indianapolis, in the county of Marion and State of Indiana, have invented a new and useful Pavement Plant, of which the following is a specification.

My invention relates to improvements in mixing machines and is particularly designed for asphalt mixing machines.

One of the objects of the invention is to provide a mixing machine which may be readily disassembled for transportation and again assembled for operating purposes.

In the embodiment of the invention illustrated:

Fig. 1 is a side elevation of a mixing machine embodying the features of my invention;

Fig. 5 is a detail section of the storage bin;

Fig. 6 is an enlarged detail view of the top of one of the elevators.

Fig. 7 is a detail sectional view on the line 7—7 of Fig. 1; and

Fig. 8 is a detail sectional view on the line 8—8 of Fig. 1.

The material for which the structure to be described is particularly designed to handle is what is known as emulsified asphalt and comprises, generally speaking, a mixture of rough material such for instance as sand or gravel or a mixture of both with an emulsified bituminous material. These two materials being mixed together to be laid to form roads and pavements.

In the structure illustrated I provide a storage bin 9 which is adapted to receive from either or both of the pair of elevators 10 and 11 the rough material or sand and stone. This bin delivers into a weigh box 12 which is adapted to measure the material. The weigh box in turn discharges into the mixing machine 14 which in turn is arranged to discharge into a vehicle or other device adapted to be located beneath the mixing machine for the purpose of receiving material.

Figure 3:
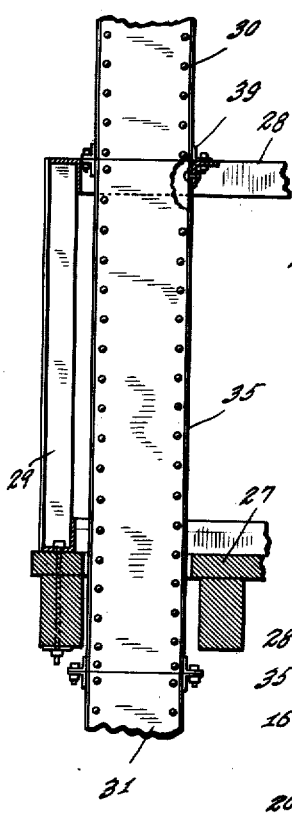
Fig. 3 is an enlarged detail view of one of the elevators.
Figure 2:
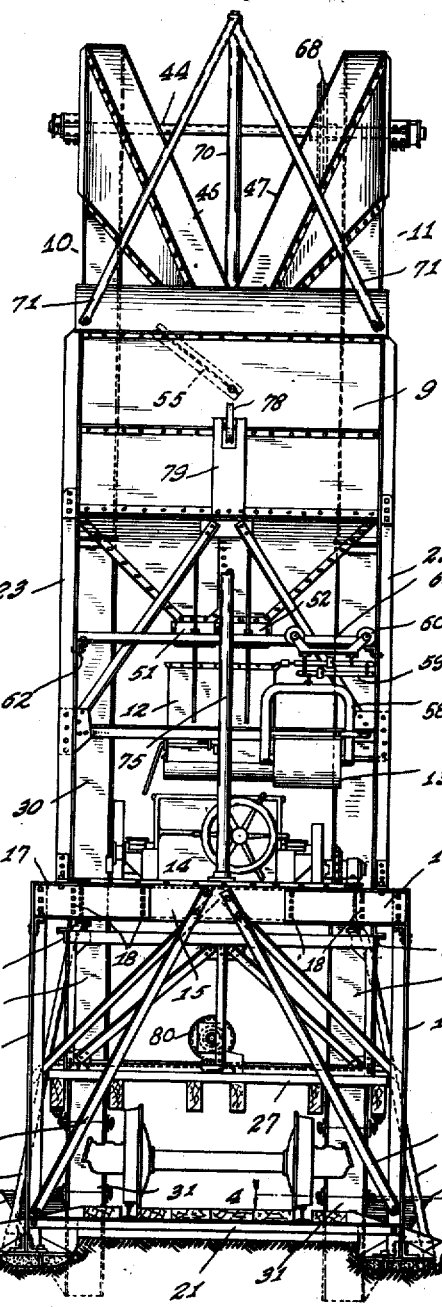
Fig. 2 is a front elevation thereof.
Figure 4:
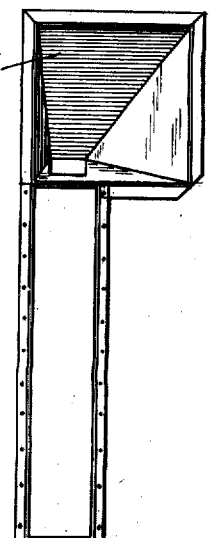
Fig. 4 is a section on the line 4—4 of Fig. 2.

The storage bin, weigh box, mixing machine, etc., are mounted upon a supporting platform comprising suitable supporting or plank members secured between the I beams 15, which comprise the two side and two end members of the platform. The floor beams are secured between these I beams and the mixing machine 14 and weigh box 12 are supported upon the floor beams of the platform. This platform is supported in an elevated position by four corner legs 16 which are sufficiently high to support the platform well above the ground to permit a wagon to drive beneath the same. At their upper ends each of the corner legs is bolted to a side plate 17 which plate in turn at its opposite end is bolted by suitable securing bolts 18 to the platform. The legs therefore are spaced a distance slightly greater than the width of th platform and, as will be seen from Fig. 2, are sufficiently spaced apart to straddle an ordinary railroad track. The lower ends of the legs are secured to suitable foot plates 19 which may rest upon cement blocks or other solid structures. The two front legs of the platform are braced by suitable diagonally disposed bracing members 20 secured at their lower ends to the lower ends of the legs and at their upper ends to the end I beam of the platform. The front legs also at their bottoms are braced by a cross brace 21. Each of the rear legs is braced by a diagonally extending brace 22 extending from the bottom of the leg to one of the side I beams 15 of the platform. The legs as well as the braces thus described are all removably attached to the platform so that they may be detached therefrom when it is desired to disassemble the structure for storage purposes. The bin 9 is supported above the platform and above the mixer 14 and weighing box 12, on four corner legs 23 which preferably are formed from angle irons and at their upper ends are removably secured to the four corners of the bin, these legs at their lower ends being adapted to be removably bolted to the members 17 to which the platform legs are bolted. In addition to the four corner legs for the bin 9 I provide on each side a pair of supporting legs 24 which converge at their lower ends to a bearing adapted to be secured on trunnions 26 extending laterally from the two side I beams 15 of the platform. The platform and other parts of the machine when disassembled are adapted to be carried upon a flat car of the ordinary flat type and to this end I provide a flat car 27 the front end of which is provided with a framework comprising a rectangular frame having its side ends formed of angle members 28 suitably elevated above the floor of the car and supported by suitable supporting members as 29 from the car. This supporting member is substantially of the same width as the platform on which the parts are mounted and as the floor of the car. However it will be seen that the legs 16 when attached to the platform are spaced suitably far enough apart to permit the car to pass between the same.

Material is delivered to the storage bin 9 by the conveyor chains 10' of the elevators 10 and 11 which are arranged at opposite sides but in front of the platform 15. These conveyors operate in housings 30 which are formed in sections to permit disassembly thereof. The housings extend from beneath the floor of the car 27 through the floor and to a point above the bin 9. Each of these housings comprises a plurality of sections, the lower section 31 being provided with an offset hopper 32 to permit the material to be deposited therein and this lower section carries the journal members 33 for the lower sprocket wheel 34 of the chain. A second section 35 of the housing is secured thereto by suitable angle irons or the like and extends through the floor of the car upwardly adjacent the side members 28 of the frame on the car and is secured to the side members 28 of the frame by means of an angle iron 39 whereby this section of the housing will be supported by the frame on the car. The third and fourth intermediate sections are suitably secured together and support the top section 40. This top section is jointed to the next lower section of the housing at 41 by means of angle irons and the joint between these two sections is formed to intersect a suitable bearing 42 supported on an angle iron 43 on the housing. Mounted to rotate in the bearings of each of the housings is a shaft 44 on each end of which is the top sprocket 45 of the elevators. The elevators respectively discharge into inclined spouts 46 and 47 which in turn discharge into the bin 9. This bin is of the hopper bottom type and is divided into two compartments 48 and 49, discharging through spouts 51 and 52 respectively which are controlled by suitable gate valves 53 and 54 whereby the discharge of the contents of each hopper may be separately controlled.

Spouts 46 and 47 are so arranged that they will be caused to discharge both into either of the compartments 48 or 49 or separately one into each compartment. To this end the center wall 50 at its upper end is provided with a valve 55 which, as shown in Fig. 5, may be swung to one side or the other so that the discharged contents of the spouts 46 and 47 will be deflected into either of the bins 48 or 49. Or if desired the valve 55 may be moved to a central position whereby the discharging contents of the spout 46 will discharge into the bin 48 and the spout 47 will discharge into the bin 49. The upper end of each of the elevator housings is supported from a rearwardly extending arm 56 secured to the upper end of the bin 9 and provided with a brace 57 so that by means of the arm 56 and the side member 28 the boot of each of the elevators will be rigidly supported in position.

The bucket 13 is provided with a bail 58 which depends from the beam of a weighing scale 59. This scale is supported from a trolley 60 which travels on a track 61 on cross arms 62 extending between the legs 24 and the legs 23 of the bin 9.

Power for the operating mechanism including the mixer 14 and the elevating conveyors 11 is supplied from a suitable engine 63 which is mounted on the car 27. This engine is connected by a belt 64 to a drive wheel 65 the shaft of which is supported in bearings 66 mounted on the legs 23 and its shaft is connected by a suitable sprocket chain 67 with a sprocket wheel 68 on the shaft 44. A similar sprocket chain 69 extends between the mixing machine 14 and the shaft driven by the drive wheel 65.

Removably mounted on top of the bin 9 is a crane the mast 70 of which extends vertically between the housings of the two conveyors and is suitably braced by a diagonally extending brace rod 71 removably bolted to the corners of the bin. The arm 72 of this mast is arranged to carry a suitable pulley 73 and is braced by diagonally bracing arms 74. This crane is used for handling the heavy parts particularly of the housings and conveyors when the apparatus is disassembled and after these parts have been disassembled this crane itself may be disassembled for storage purposes.

The apparatus is shown in Fig. 1 in its assembled and operative position. In event it is desired to transport the apparatus to some other point the car is moved forward until the platform 15 lies immediately above the raised frame 28, the platform 15 being supported on the leg 16 sufficiently high to permit the frame 28 to pass beneath the same and the legs 16 being sufficiently spaced on each side of the track to permit the car to pass between the same. The various sections of the two elevators are then disassembled and lowered by means of the crane to be stored on the car after which the cam jacks 73, which are adapted when manipulated to engage with angle platforms 74 at the four corners of the frame 28, are manipulated to raise the platform 15 and take the weight of this platform and the parts carried thereby off of the legs 16. The legs are then removed and stored in suitable position on the car and the bracing legs 23 of the bin 9 are removed leaving the bin supported solely by the legs 24 on the trunnions 26. The front end of the platform 15 is provided with a removably mounted mast 75 having a pulley 76 over which a cable 77 is adapted to pass. This cable likewise passes over a pulley 78 mounted on a frame 79 secured to the front end of the bin 9 and this cable leads to a hand winch 80 mounted in the framework supporting the platform 28 whereby by the manipulation of this winch the bin may be lowered to a horizontal position, indicated in dotted lines in Fig. 1, on the trunnions 26, after which the mast 75 may be disassembled. The parts may then all be assembled on the car and transported to the point desired.

In assembling, the car is run to the point desired and the cam jacks 73 which, after the parts have been disassembled are manipulated to lower the platform on the frame 28, are again manipulated to raise the platform slightly above the frame 28. The legs 16 are then bolted to the platform and the cam jacks 73 manipulated to throw the weight of the platform on the legs which will leave the platform raised sligtly above the frame 28 on the car. After which the car may be backed out into the position illustrated in Fig. 1 and the remaining parts assembled for the purpose of operation of the mechanism.

I claim as my invention:

1. In a portable paving plant, the combination with a vehicle, of a platform, material handling apparatus mounted on said platform including a mixer and a material bin above said mixer for delivering material thereto, detachable legs for supporting said platform on the ground so as to form a driveway therebeneath, the width of said platform and the spacing of said legs being such as to permit the vehicle to pass under said platform between said legs, a storage platform on said vehicle of a height less than the height at which said material handling platform is supported by said legs for receiving said material handling platform, and means for raising the material handling platform and the apparatus supported thereby on the storage platform to permit the legs to be inserted in and removed from position and lowering the mixer platform onto said legs to permit the vehicle and storage platform to be drawn from beneath the mixer platform.

2. In an apparatus of the character described, the combination with a vehicle, of a platform arranged to be carried on said vehicle, material-handling apparatus including a mixer and a supply bin for handling material to said mixer mounted on said platform, detachable legs arranged to be secured to said platform, the width of said platform and spacing of said legs being such as to permit the vehicle to pass beneath said platform between said legs, means for elevating said platform and the apparatus carried thereby on said vehicle and after the legs are attached to shift the weight of said platform from said vehicle to said legs to permit the vehicle to be withdrawn from beneath the platform.

3. In an apparatus of the character described, the combination with a railroad car, of a platform arranged to be carried on said car, material-handling apparatus including a mixer and a material bin for delivering material thereto mounted on said platform, power mechanism for said handling apparatus mounted on said car, detachable legs arranged to be secured to said platform on opposite sides of said car, the width of said platform and spacing of said legs being such as to permit the car to pass beneath said platform between said legs, and means for elevating the platform on the car to permit the legs to be secured in position and shifting the weight of said platform and said material handling apparatus from said car to said legs to permit the car to be withdrawn from beneath the platform.

4. In an apparatus of the character described, the combination with a car, of a platform arranged to be carried on said car, mixing apparatus mounted on said platform, a storage platform on said car for supporting the mixing platform above the floor of the car, and a material storage bin supported on said platform above said mixing apparatus, supporting means for said bin having pivoted connection with said platform to permit said bin to be lowered from a position above said mixing apparatus to a substantially horizontally position when said bin is not in use.

5. In an apparatus of the character described, the combination with a car, of a platform arranged to be carried on said car, mixing apparatus mounted on said platform, a storage bin hingedly mounted above said mixing apparatus, means for supporting said platform independently of said car and permitting said car to be moved from under said platform, a power apparatus mounted on said car for driving said mixing apparatus, and an elevating conveyor removably supported at one end on said car and at its opposite end on said platform and arranged to deliver material into said storage bin.

6. In an apparatus of the character described, the combination with a transporting car, of a supporting platform arranged to be carried by said car, mixing apparatus mounted on said platform and a material storage bin mounted above said mixing apparatus and supported on said platform, supporting legs for receiving the weight of said platform to permit said car to be withdrawn from beneath the same, a pair of elevating conveyors detachably mounted into position and mounted within the side limits of said bin, the lower ends of said conveyors being supported by said car and projecting below the platform of said car and the upper ends of said conveyors being supported by said platform and arranged to deliver into said storage bin, and power apparatus mounted on said car and connected with said mixing apparatus and with said elevators for operating the same.

7. In an apparatus of the character described, the combination with a platform supported above the ground to permit vehicles to pass beneath the same, of a mixing apparatus mounted on said platform, a material storage bin supported by said platform above said mixing apparatus and divided into compartments, a pair of elevating conveyors for elevating material and delivering the same into said bin, and means for causing both of said conveyors to discharge into either of the compartments of said bin.

8. In an apparatus of the character described, the combination with a platform elevated above the ground to permit vehicles to pass beneath the same, of a mixing apparatus mounted on said platform, a material storage bin supported on said platform above said mixing apparatus and arranged to deliver thereto, said bin being divided into compartments, a pair of elevating conveyors for elevating material to said bin and discharging therein, a valve for deflecting the material discharged from said elevators into the different compartments of said bin.

In witness whereof, I have hereunto set my hand at Indianapolis, Indiana, this 1st day of May, A. D. one thousand nine hundred and twenty two.

CARL F. HETHERINGTON.

paratus and supported on said platform, supporting legs for receiving the weight of said platform to permit said car to be withdrawn from beneath the same, a pair of elevating conveyors detachably mounted into position and mounted within the side limits of said bin, the lower ends of said conveyors being supported by said car and projecting below the platform of said car and the upper ends of said conveyors being supported by said platform and arranged to deliver into said storage bin, and power apparatus mounted on said car and connected with said mixing apparatus and with said elevators for operating the same.

7. In an apparatus of the character described, the combination with a platform supported above the ground to permit vehicles to pass beneath the same, of a mixing apparatus mounted on said platform, a material storage bin supported by said platform above said mixing apparatus and divided into compartments, a pair of elevating conveyors for elevating material and delivering the same into said bin, and means for causing both of said conveyors to discharge into either of the compartments of said bin.

8. In an apparatus of the character described, the combination with a platform elevated above the ground to permit vehicles to pass beneath the same, of a mixing apparatus mounted on said platform, a material storage bin supported on said platform above said mixing apparatus and arranged to deliver thereto, said bin being divided into compartments, a pair of elevating conveyors for elevating material to said bin and discharging therein, a valve for deflecting the material discharged from said elevators into the different compartments of said bin.

In witness whereof, I have hereunto set my hand at Indianapolis, Indiana, this 1st day of May, A. D. one thousand nine hundred and twenty two.

CARL F. HETHERINGTON.

Certificate of Correction.

It is hereby certified that in Letters Patent No. 1,548,014, granted July 28, 1925, upon the application of Carl F. Hetherington, of Indianapolis, Indiana, for an improvement in "Pavement Plants," an error appears in the printed specification requiring correction as follows: Page 3, line 108, claim 4, after the word "position" insert the words *on the car floor;* and that the said Letters Patent should be read with this correction therein that the same may conform to the record of the case in the Patent Office.

Signed and sealed this 1st day of September, A. D. 1925.

[SEAL.]
KARL FENNING,
*Acting Commissioner of Patents.*

Certificate of Correction.

It is hereby certified that in Letters Patent No. 1,548,014, granted July 28, 1925, upon the application of Carl F. Hetherington, of Indianapolis, Indiana, for an improvement in "Pavement Plants," an error appears in the printed specification requiring correction as follows: Page 3, line 108, claim 4, after the word " position " insert the words *on the car floor;* and that the said Letters Patent should be read with this correction therein that the same may conform to the record of the case in the Patent Office.

Signed and sealed this 1st day of September, A. D. 1925.

[SEAL.]
KARL FENNING,
*Acting Commissioner of Patents.*